United States Patent
Van Tol et al.

(10) Patent No.: US 12,320,695 B2
(45) Date of Patent: Jun. 3, 2025

(54) SYSTEM, PYRANOMETER, METHOD AND COMPUTER PROGRAM PRODUCT FOR MEASURING THE SOLAR RADIATION

(71) Applicant: OTT HydroMet B.V., Delft (NL)

(72) Inventors: Alwin Jacob Van Tol, Delft (NL); Hendrikus Adrianus Franciscus Nagel, Delft (NL); Joop Mes, Delft (NL)

(73) Assignee: OTT HydroMet B.V., Delft (NL)

( * ) Notice: Subject to any disclaimer, the term of this patent is extended or adjusted under 35 U.S.C. 154(b) by 0 days.

(21) Appl. No.: 18/694,840

(22) PCT Filed: Sep. 8, 2022

(86) PCT No.: PCT/EP2022/074982
§ 371 (c)(1),
(2) Date: Mar. 22, 2024

(87) PCT Pub. No.: WO2023/046496
PCT Pub. Date: Mar. 30, 2023

(65) Prior Publication Data
US 2024/0393169 A1    Nov. 28, 2024

(30) Foreign Application Priority Data
Sep. 24, 2021   (EP) .................... 21198712

(51) Int. Cl.
*G01J 1/42* (2006.01)
*G01W 1/12* (2006.01)

(52) U.S. Cl.
CPC .............. *G01J 1/42* (2013.01); *G01W 1/12* (2013.01); *G01J 2001/4285* (2013.01)

(58) Field of Classification Search
CPC .............. G01J 1/42; G01J 2001/4285; G01J 2001/4266; G01W 1/12
See application file for complete search history.

(56) References Cited

U.S. PATENT DOCUMENTS

| | | | |
|---|---|---|---|
| 9,857,810 B2 * | 1/2018 | Smith, Jr. | F24D 5/005 |
| 2011/0273704 A1 * | 11/2011 | Burba | G01J 1/4228 250/237 R |
| 2018/0017437 A1 | 1/2018 | Poutiatine | |

FOREIGN PATENT DOCUMENTS

EP    3839452 A1    6/2021

OTHER PUBLICATIONS

European Patent Office, International Search Report and Written Opinion, May 10, 2023, 18 pages.

(Continued)

*Primary Examiner* — Seung C Sohn
(74) *Attorney, Agent, or Firm* — Ference & Associates LLC

(57) ABSTRACT

The present invention relates to a system for measuring the solar radiation, a pyranometer for measuring the solar radiation, a method for measuring the solar radiation and a corresponding computer program product. According to an aspect, there is provided a system for measuring the solar radiation, comprising: a solar radiation measuring sensor configured to measure a solar radiation at a measuring rate; a data logger; and a control unit operatively connected to the solar radiation measuring sensor and to the data logger; wherein the control unit is configured to calculate based on a selectable averaging function at least one average value of the solar radiation measured by the solar radiation measuring sensor over a specified number of solar radiation samples, wherein the data logger is configured to at least partly record the at least one average value of the solar radiation calculated by the control unit at a recording rate, and wherein the control unit is configured to determine the recording rate of the data logger and further configured to select the selectable averaging function from a plurality of (Continued)

averaging functions for calculating the average value based on the recording rate of the data logger.

13 Claims, 5 Drawing Sheets

(56)  References Cited

OTHER PUBLICATIONS

Anonymous, "HOBOware User's Guide New HOBO ware Features", Jan. 1, 2020, 226 pages, XP055901007, Retrieved from the Internet on Mar. 20, 2024, available at: https://www.onsetcomp.com/sites/default/files/resources-documents/12730-AE%20HOBOware%20User%27s%20Guide.pdf.

Anonymous, "RK600-07E Data Logger AWS", Jan. 1, 2015, 9 pages, XP093009365, Retrieved from the Internet on Mar. 20, 2024, available at: https://img80003232.weyesimg.com/uploads/rikasensor.com/addon/16807805804282.pdf.

J. Hubner et al., "A horizontal mobile measuring system for atmospheric quantities", Atmospheric Measurement Techniques, Sep. 16, 2014, 14 pages, vol. 7, No. 9, Copernicus Publications on behalf of the European Geosciences Union.

\* cited by examiner

SYSTEM, PYRANOMETER, METHOD AND COMPUTER PROGRAM PRODUCT FOR MEASURING THE SOLAR RADIATION

The present application is a National Phase Entry of PCT International Application No. PCT/EP2022/074982, which was filed on Sep. 8, 2022, the contents of which are hereby incorporated by reference, which claims priority to EP Application No. 21198712.8 filed Sep. 24, 2021, the contents of which are hereby incorporated by reference.

TECHNICAL FIELD

The present invention relates to a system for measuring the solar radiation, a pyranometer for measuring the solar radiation, and a method for measuring the solar radiation.

BACKGROUND

The amount of solar radiation incident at the Earth's surface can be measured by an instrument known as "actinometer". Particularly, the actinometers used in meteorology to measure solar radiation are pyranometers, pyrheliometers and net radiometers.

More particularly, the pyranometer is an instrument for measuring the solar radiation on a planar surface, e.g., a ground surface. Pyranometers are usually used in conjunctions with other apparatus(es), among others solar simulators and photovoltaic systems. In this contest, the measurements provided by the pyranometer are, in turn, particularly used for calculating the photovoltaic module effective power and/or other system performances. Accordingly, the measurement accuracy of a pyranometer is one outmost aspect of this measuring instrument.

Pyranometers are usually grouped in two different categories, according to the working principle for the measurement of the solar radiation, namely thermopile-based sensor pyranometers and silicon semiconductor-based pyranometers.

In a thermopile-based sensor pyranometer, the solar radiation is measured by a sensor based on one or more thermopiles and designed to measure the broad band of the solar radiation flux density possibly from a 180° field of view angle.

Although the solar radiation incident at the top of the Earth's atmosphere is relatively constant, the actual amount of solar radiation reaching the Earth's surface is variable. The variation of the solar radiation reaching the surface depends on the location, date and time of the day, and the atmospheric conditions, and it may also quickly change over the time.

To accurately measure the value of the solar radiation with reduced uncertainty, the pyranometer should closely follow the variation of the solar radiation over the time, and should neither under, nor over represent the solar radiation, specifically if a quick change in the amount of solar radiation occurs, e.g., due to cloudy-sky conditions.

Traditional pyranometers achieve accurate measurements by a slow response while integrating the signal over a longer time. In contrast, pyranometers particularly provided with micro thermopiles-based sensors are characterized by a faster response, typically lower than about 0.02 seconds. However, the solar radiation sensor is usually read out and/or data are transferred to a data recorder at a reduced rate (e.g. approx. once per second, or even once per minute). This reduced rate may particularly be caused by a data bus system having a reduced bandwidth. In other words, the value of the solar radiation measured by the thermopile-based sensor is recorded at a recording rate (of e.g., once per second, or even once per minute) lower than the measuring rate of the thermopile-based sensor. This discrepancy between the measuring rate of the thermopile-based sensor and the recording rate of the data recorder, e.g. comprising a datalogger, may result in the loss of information on the solar radiation, e.g. loss of a portion of the solar radiation that is not recorded by the data recorder. As a result, the accuracy of data obtained from pyranometers is negatively affected.

Additionally, clouds can also cause an enhancement of the incoming solar radiation above the extra-terrestrial solar constant corresponding to about 1367 W/m$^2$±3%. Particularly, partially cloudy skies with broken clouds lead to multiple scattering and radiation reflection, resulting in an increase of the incoming solar radiation impinging on a pyranometer. In other words, this atmospheric condition causes "spikes" in the solar radiation, i.e., an increased irradiance from a portion of the sky exceeding the expected irradiance value during actual clear sky conditions, particularly above the extra-terrestrial solar constant corresponding to about 1367 W/m$^2$±3%. In turn, these spikes in the solar radiation may damage photovoltaic systems. However, when a pyranometer is provided with a logging or recording system having a slower recording rate and only an average value of the solar radiation over the logging period is reported, a loss of information relating to these spikes in the solar radiation may occur.

Accordingly, there is the need to improve the accuracy of data obtained from pyranometers.

SUMMARY

An object of the present invention is enhancing the accuracy of data obtained from systems for measuring the solar radiation, e.g., a pyranometer.

The above objects are solved by the features of the independent claims, wherein particular embodiments are subject of the dependent claims.

According to an aspect, there is provided a system for measuring the solar radiation, comprising: a solar radiation measuring sensor configured to measure a solar radiation at a measuring rate; a data logger; and a control unit operatively connected to the solar radiation measuring sensor and to the data logger; wherein the control unit is configured to calculate based on a selectable averaging function at least one average value of the solar radiation measured by the solar radiation measuring sensor over a specified number of solar radiation samples, wherein the data logger is configured to at least partly record the at least one average value of the solar radiation calculated by the control unit at a recording rate, and wherein the control unit is configured to determine the recording rate of the data logger and further configured to select the selectable averaging function from a plurality of averaging functions for calculating the average value based on the recording rate of the data logger.

Advantageously, the averaging function for calculating the average value is selected from a plurality of averaging functions based on a recording rate at which the data logger is set. Meanwhile, the solar radiation measuring sensor is measuring a solar radiation at a relatively fast measuring rate. Accordingly, a solar radiation equivalent value accurately representing the measured solar radiation in the past time frame is provided and, then, recorded. As a result, the accuracy of data obtained from the solar radiation system is enhanced.

Particularly, the recording rate of, or achieved by, the data logger is lower than the measuring rate of the solar radiation measuring sensor, e.g. due to a limited bandwidth of a bus system between the data logger and the solar radiation measuring sensor.

Particularly, the averaging function is selected from a true averaging function, a moving averaging function, and/or an exponential averaging function of the solar radiation measured by the solar radiation measuring sensor over a specified (predetermined or predeterminable) time frame.

Particularly, when the solar radiation measured by the solar radiation measuring sensor exceeds a specified (predetermined or predeterminable) value, the control unit is configured to calculate a standard deviation value of the solar radiation over a specified (predetermined or predeterminable) number of solar radiation samples.

Advantageously, as an average determined or recorded by the logging system might not show the occurrence of spikes in the solar radiation, the occurrence of such spikes may be accurately detected or logged by the system.

Particularly, the control unit is further configured to emit a signal when the solar radiation measured by the solar radiation sensor exceeds the specified (predetermined or predeterminable) value.

Particularly, when the solar radiation measured by the solar radiation measuring sensor exceed a specified (predetermined or predeterminable) value, the control unit is further configured to determine a number of solar radiation samples exceeding the specified (predetermined or predeterminable) value.

Particularly, the average value is calculated over a fixed averaging time range, or over a variable averaging time range.

Particularly, the solar radiation measuring sensor comprises at least one thermopile-based sensor, particularly wherein the solar radiation measuring sensor has a measuring rate greater than about 2 Hz.

Particularly, the recording rate of the data logger is lower than about 1 Hz.

Particularly, if the recording rate of the data logger is substantially equal to (or greater than) the measuring rate of the solar radiation measuring sensor, the data logger is configured to directly record at least one of the solar radiation samples measured by the solar radiation measuring sensor.

According to a further aspect, there is provided a system for measuring the solar radiation, comprising: a solar radiation measuring sensor configured to measure a solar radiation at a measuring rate; a data logger; and a control unit operatively connected to the solar radiation measuring sensor and to the data logger; wherein the control unit is configured to calculate based on a specified averaging function at least one average value of the solar radiation measured by the solar radiation measuring sensor over a specified number of solar radiation samples, wherein the data logger is configured to at least partly record the at least one average value of the solar radiation calculated by the control unit at a recording rate, and wherein the control unit is configured to determine the recording rate of the data logger and further configured to modify one or more parameters of the specified (predetermined or predeterminable) averaging function for calculating the average value based on the recording rate of the data logger.

Advantageously, one or more parameters of the specified (predetermined or predeterminable) averaging function for calculating the average value is modified based on a recording rate at which the data logger is set. Meanwhile, the solar radiation measuring sensor is measuring a solar radiation at a relatively fast measuring rate. Accordingly, a solar radiation equivalent value accurately representing the measured solar radiation in the past time frame is provided and, then, recorded. As a result, the accuracy of data obtained from the solar radiation system is enhanced.

As is apparent, the foregoing aspects of the present application represent alternative solutions to the technical problem of enhancing the accuracy of data (such as solar radiation measurements) obtained from pyranometers.

A solution to this problem is provided by the above mentioned aspect that relates to a system for measuring the solar radiation, comprising: a solar radiation measuring sensor, a data logger and a control unit that is configured to calculate based on a selectable averaging function, at least one average value of the solar radiation measured by the solar radiation measuring sensor over a specified number of solar radiation samples. The data logger is configured to at least partly record the at least one average value of the solar radiation calculated by the control unit at a recording rate. Advantageously, the control unit is configured to determine the recording rate of the data logger and further configured to select the selectable averaging function from a plurality of averaging functions for calculating the average value based on the recording rate of the data logger. This allows to enhance the accuracy of data (solar radiation measurements) obtained from pyranometers.

Another solution to the above technical problem is provided by a system for measuring the solar radiation, comprising: a solar radiation measuring sensor, a data logger and a control unit that is configured to calculate based on a specified (predetermined or predeterminable) averaging function at least one average value of the solar radiation measured by the solar radiation measuring sensor over a specified number of solar radiation samples. The data logger is configured to at least partly record the at least one average value of the solar radiation calculated by the control unit at a recording rate. Advantageously, the control unit is configured to determine the recording rate of the data logger and further configured to modify one or more parameters of the specified (predetermined or predeterminable) averaging function for calculating the average value based on the recording rate of the data logger. This allows to enhance the accuracy of data (solar radiation measurements) obtained from pyranometers.

In summary, the foregoing solutions solve the addressed problem by a series of common features, i.e., a solar radiation measuring sensor, a data logger, and a control unit. However, the claimed solutions comprise alternative features, that is, in the first aspect, the control unit is configured to determine the recording rate of the data logger and further configured to select the selectable averaging function from a plurality of averaging functions for calculating the average value based on the recording rate of the data logger, whereas, in the second aspect, the control unit is configured to determine the recording rate of the data logger and further configured to modify one or more parameters of the specified (predetermined or predeterminable) averaging function for calculating the average value based on the recording rate of the data logger.

Accordingly, the systems for measuring the solar radiation according to the above first and second aspects while providing alternative configurations nevertheless solve a common technical problem.

Particularly, the (modified) one or more parameters of the specified (predetermined or predeterminable) averaging function for calculating the average value comprises an averaging or integration time.

Particularly, the recording rate of, or achieved by, the data logger is lower than the measuring rate of the solar radiation measuring sensor, e.g. due to a limited bandwidth of a bus system between the data logger and the solar radiation measuring sensor.

Particularly, the specified (predetermined or predeterminable) averaging function specifically is a true averaging function, a moving averaging function, and/or an exponential averaging function of the solar radiation measured by the solar radiation measuring sensor over a specified (predetermined or predeterminable) time frame.

Particularly, when the solar radiation measured by the solar radiation measuring sensor exceeds a specified (predetermined or predeterminable) value, the control unit is configured to calculate a standard deviation value of the solar radiation over a specified (predetermined or predeterminable) number of solar radiation samples.

Advantageously, as an average determined or recorded by the logging system might not show the occurrence of spikes in the solar radiation, the occurrence of such spikes may be accurately detected or logged by the system.

Particularly, the control unit is further configured to emit a signal when the solar radiation measured by the solar radiation sensor exceeds the specified (predetermined or predeterminable) value.

Particularly, when the solar radiation measured by the solar radiation measuring sensor exceed a specified (predetermined or predeterminable) value, the control unit is further configured to determine a number of solar radiation samples exceeding the specified (predetermined or predeterminable) value.

Particularly, the average value is calculated over a fixed averaging time range, or over a variable averaging time range.

Particularly, the solar radiation measuring sensor comprises at least one thermopile-based sensor, particularly wherein the solar radiation measuring sensor has a measuring rate greater than about 2 Hz.

Particularly, the recording rate of the data logger is lower than about 1 Hz.

Particularly, if the recording rate of the data logger is substantially equal to (or greater than) the measuring rate of the solar radiation measuring sensor, the data logger is configured to directly record at least one of the solar radiation samples measured by the solar radiation measuring sensor.

According to a further aspect, there is provided a pyranometer comprising: a solar radiation measuring sensor configured to measure a solar radiation at a measuring rate; and a control unit operatively connectable to the solar radiation measuring sensor and to a data logger, wherein the control unit is configured to calculate based on a selectable averaging function at least one average value of the solar radiation measured by the solar radiation measuring sensor over a specified (predetermined or predeterminable) number of solar radiation samples, and wherein the control unit is configured to determine the recording rate of the data logger and further configured to select the selectable averaging function from a plurality of averaging functions for calculating the average value based on the recording rate of the data logger.

According to a further aspect, there is provided a pyranometer comprising: a solar radiation measuring sensor configured to measure a solar radiation at a measuring rate; and a control unit operatively connectable to the solar radiation measuring sensor and to a data logger, wherein the control unit is configured to calculate based on a specified averaging function at least one average value of the solar radiation measured by the solar radiation measuring sensor over a specified (predetermined or predeterminable) number of solar radiation samples, and wherein the control unit is configured to determine the recording rate of the data logger and further configured to modify one or more parameters of the specified (predetermined or predeterminable) averaging function for calculating the average value based on the recording rate of the data logger. According to another aspect, there is provided a method of measuring a solar radiation comprising:

measuring a solar radiation at a measuring rate;

calculating based on a selectable averaging function an average value of the solar radiation over a specified (predetermined or predeterminable) number of solar radiation samples, wherein the selectable averaging function is selected based on a recording rate from a plurality of averaging functions for calculating the average value of the solar radiation;

at least partly recording the calculated average value of the solar radiation at the recording rate.

Particularly, the recording rate is lower than the measuring rate.

Particularly, the measuring rate is greater than about 2 Hz; and/or wherein the recording rate is lower than about 1 Hz.

Particularly, the averaging function is selected from a true averaging function, a moving averaging function, and/or an exponential averaging function over a specified (predetermined or predeterminable) time frame.

Particularly, when the measured solar radiation exceeds a specified (predetermined or predeterminable) value, further comprising: calculating a standard deviation value of the solar radiation over a specified (predetermined or predeterminable) number of solar radiation samples, and/or particularly emitting a signal; and/or particularly determining a number of solar radiation samples exceeding the specified (predetermined or predeterminable) value.

Particularly, if the recording rate is substantially equal to the measuring rate, further comprising: directly recording at least one of the measured solar radiation samples.

According to another aspect, there is provided a method of measuring a solar radiation comprising:

measuring a solar radiation at a measuring rate;

calculating, based on a specified (predetermined or predeterminable) averaging function, an average value of the solar radiation over a specified (predetermined or predeterminable) number of solar radiation samples, at least partly recording the calculated average value of the solar radiation at a recording rate;

determining the recording rate; and modifying one or more parameters of the specified (predetermined or predeterminable) averaging function for calculating the average value based on the recording rate.

Particularly, the one or more parameters of the specified (predetermined or predeterminable) averaging function for calculating the average value is the averaging or integration time.

Particularly, the recording rate is lower than the measuring rate.

Particularly, the measuring rate is greater than about 2 Hz; and/or wherein the recording rate is lower than about 1 Hz.

Particularly, the specified averaging function is or is based on a true averaging function, a moving averaging function, and/or an exponential averaging function over a specified (predetermined or predeterminable) time frame.

Particularly, when the measured solar radiation exceeds a specified (predetermined or predeterminable) value, further comprising: calculating a standard deviation value of the solar radiation over a specified (predetermined or predeterminable) number of solar radiation samples, and/or particularly emitting a signal; and/or particularly determining a number of solar radiation samples exceeding the specified (predetermined or predeterminable) value.

Particularly, if the recording rate is substantially equal to the measuring rate, further comprising: directly recording at least one of the measured solar radiation samples.

According to an aspect, there is provided a computer program product comprising computer-readable instructions which, when loaded and executed on a suitable system, perform the steps of a method according to the above aspect.

These and other objects, features and advantages of the present invention will become more apparent upon a reading of the following detailed description and accompanying drawings. It should be understood that even though embodiments are separately described, single features thereof may be combined to additional embodiments.

Figure 1:
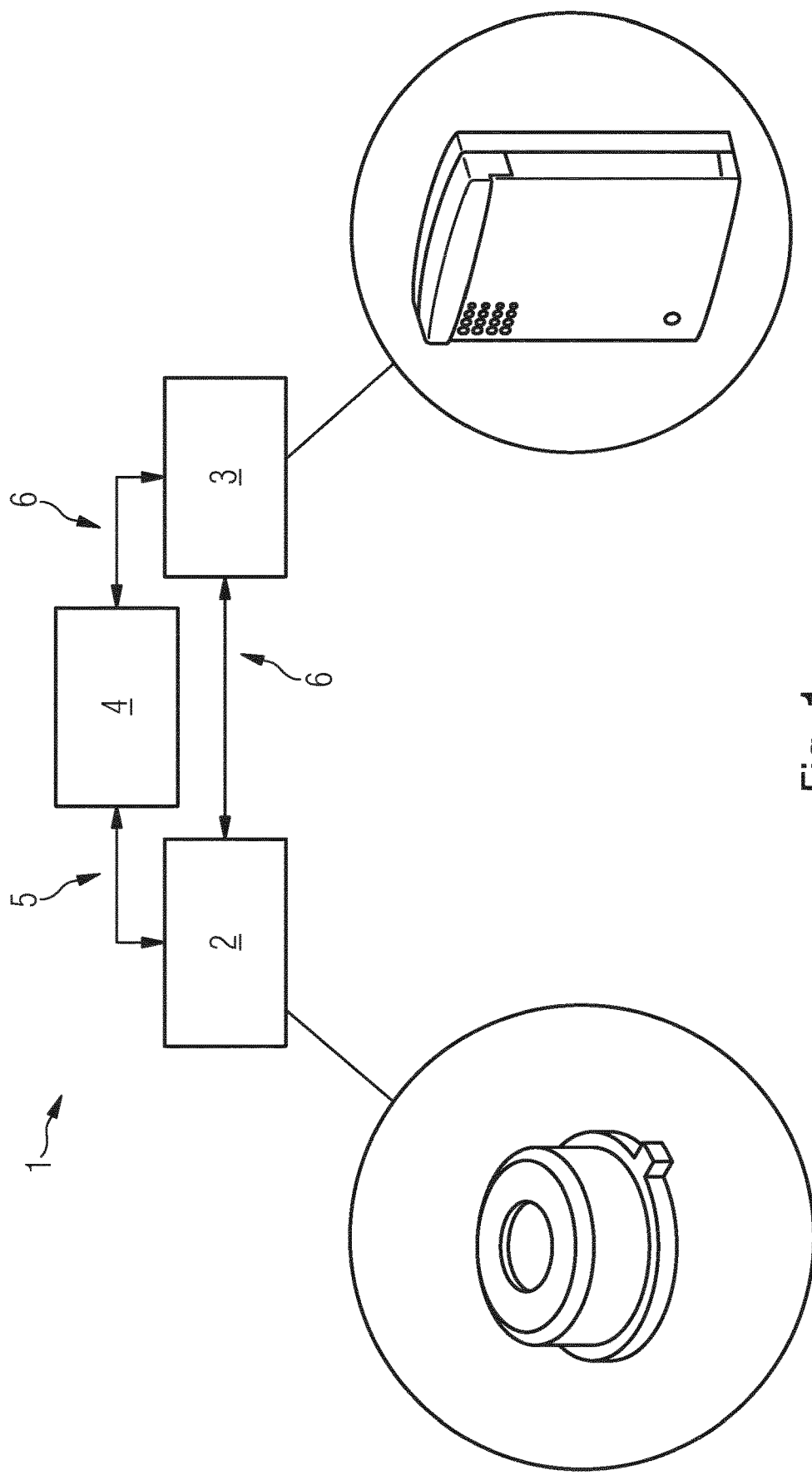
FIG. 1, is a schematic view of the system for measuring the solar radiation according to an embodiment.

With reference to FIG. 1, the system for measuring the solar radiation is generally indicated with the reference sign 1. The system 1 comprises a solar radiation measuring sensor 2, a data logger 3, and/or a control unit 4. The system 1 may be powered by a powering unit, and/or it may be directly connected to a power supply line.

The solar radiation measuring sensor 2 is a measuring sensor 2 that is configured to measure a solar radiation at a measuring rate MR.

Particularly, the solar radiation measuring sensor 2 may be a thermopile-based sensor. More particularly, the solar radiation measuring sensor 2 may be a micro thermopile-based sensor.

The thermopile-based sensor 2 is a measuring sensor configured to measure the radiation impinging on a receiving surface 20 of the thermopile-based sensor 2. Particularly, the radiation impinging the thermopile-based sensor 2 may be solar radiation. The thermopile-based sensor 2 may be based on one or more thermopiles particularly suitable to measure the broad band of the radiation flux density specifically from a substantially 180° field of view angle. A thermopile specifically is an electronic device that converts thermal energy into electrical energy and comprises several thermocouples connected in series or in parallel. The thermopile works on the principle of the thermoelectric effect of generating a voltage when its dissimilar metals or thermocouples are exposed to a temperature difference. Thermocouples operate by measuring the temperature differential from their junction point to the point in which the thermocouple output voltage is measured. Once a closed circuit is made up of more than one metal and there is a difference in temperature between junctions and points of transition from one metal to another, a current is produced as if generated by a difference of potential between the junctions being at different temperatures.

Specifically, the thermopile-based sensor 2 particularly detects light of about 300 to about 2800 nm with a largely flat spectral sensitivity. Specifically, the thermopile-based sensor 2 comprises a black coating which absorbs (particularly all) radiation (e.g. solar radiation or modified solar radiation modified e.g. in its spectral composition by the optical elements in front of it, e.g. an outer and/or an inner dome, and/or an optical diffusor) impinging thereon. The active (hot) junctions of the thermocouples are located beneath (or in correspondence with or adjacent to) the black coating surface and are heated by the radiation absorbed from the black coating. The passive (cold) junctions of the thermocouples are (particularly fully) protected from radiation and in thermal contact with a housing portion, which particularly serves as a heat-sink. Particularly, the passive (cold) junctions of the thermocouples are in contact with a housing portion that may be in thermal contact with the housing, so as to substantially dissipate the heat to or through the housing. This specifically reduces or prevents any alteration from yellowing or decay when measuring the temperature in the shade, thus impairing the measure of the solar radiation by the thermopile-based sensor 2.

More particularly, the thermopile-based sensor 2 may be located in a TO (transistor outline) housing having a diameter in the range of about 1 mm to about 20 mm or lower than about 10 mm. Particularly, the TO housing and/or active component(s) of thermopile-based sensor 2 may be micro machined.

As shown in FIG. 1, the solar radiation measuring sensor 2 comprises the receiving surface 20 and a second opposite (bottom) surface 21. The receiving surface 20 of the solar radiation measuring sensor 2 may comprise, or may correspond to, the black coating surface. The second surface 21 may substantially face, and/or directly or indirectly contact a supporting surface, e.g., a housing portion of a pyranometer. The receiving surface 20 is configured to substantially receive the solar radiation impinging therein. Particularly, the radiation impinging the solar radiation measuring sensor may be solar radiation.

The solar radiation measuring sensor 2 is configured to measure a solar radiation at a measuring rate MR. The measuring rate MR of the solar radiation measuring sensor 2 is the number of times in which the solar radiation measuring sensor 2 is configured to measure the solar radiation in a specified (predetermined or predeterminable) time period. In other words, the solar radiation measuring sensor 2 may be configured to measure the solar radiation, i.e., outputting a measurement of the solar radiation, at a specified (predetermined or predeterminable) frequency. The frequency at which the solar radiation measuring sensor 2 measures (or outputs values relating to) the solar radiation is the number of measurements per unit of time, e.g., measurements per second. Particularly, the solar radiation measuring sensor 2 may have a measuring rate MR greater than about 2 Hz. In other words, the solar radiation measuring sensor 2 may be configured to provide or output a single measurement of the solar radiation every specified (predetermined or predeterminable) time period that is lower than about 0.5 seconds (2 measurements per second), particularly lower than about 0.2 seconds (5 measurements per second). Specifically, the measuring rate MR of the solar radiation measuring sensor 2 may be constant.

Particularly, the solar radiation measuring sensor 2 may have a measuring rate MR greater than about 50 Hz. In other words, the solar radiation measuring sensor 2 may be configured to provide or output a measurement of the solar radiation in a time period that is lower than about 0.02 seconds (50 measurements per second).

With reference to FIG. 1, the system 1 for measuring the solar radiation comprises the data logger 3. The data logger 3 is an electronic device that is configured to record solar radiation measurements data, over time, which are received from one or more solar radiation measuring sensors 2. As an example of a data logger 3 the "LOGBOX SE" of Kipp & Zonen may be used. A further example of a data logger 3 is the "OTT netDL 500/1000" of OTT HydroMet, the "SmartLogger3000A" of Huawei, the "Q.reader central" of "Gartner instruments Solutions GmbH, "CR1000X" of Campbell Scientific, "XLite 9210" or "SatLink 3" of Sutron Corporation.

Specifically, the data logger 3 may have a plurality of (e.g. 4) differential dc voltage inputs with a specified (predetermined or predeterminable) resolution (e.g. 10-, 12-, 16- or 24-bit resolution) and/or selectable voltage input (e.g. ranging from 19 mV to 2500 mV (2.5 V). Depending on a sensitivity of the solar radiation measuring sensor(s) 2, the data logger 3 particularly is configured to record data corresponding to changes in irradiance of 1 W/m$^2$.

Additionally or alternatively, the data logger 3 may have a plurality of (e.g. 4) single-ended voltage inputs (e.g. 12-bit voltage inputs), specifically for 2.5 V and/or 3 V signal(s). Additionally, the data logger 3 may also be configured to record data from one or more thermistors (e.g. a 10K thermistor) and/or from one or more temperature sensors (e.g. a Pt-100 temperature sensor).

Additionally or alternatively, the data logger 3 may have a plurality of (e.g. 4) logic level inputs, so that the data logger 3 is able to count signal pulses of signals received from the one or more solar radiation measuring sensors 2 and/or such that a frequency determination of signals received from the one or more solar radiation measuring sensors 2 can be achieved.

Specifically, the data logger 3 is configured to allow sampling and/or logging at rates down to about 1 second. The data logger 3 may record, in addition to the average computed on the basis on the selected averaging function, a minimum, a maximum and/or a standard deviation.

The data logger 3 may include one or more memories (e.g. one or more industrial grade SD cards) and/or a communication device (such as an internal quad-band GSM/GPRS modem with external antenna) for data transfer (particularly wireless data transfer) to a user and/or for time synchronization.

Alternatively, the data logger 3 may be a "Modbus" based data logger (digital data logger 3) providing a digital readout. More particularly, the digital readout may be at a different rate than the measurement rate of the control unit 4.

Specifically, if the data logger 3 is a digital data logger, the data logger 3 may include one or more communications interfaces. For example, the one or more communications interfaces may include one or more of Ethernet RJ-45 10 Base-T, USB Host, USB device, or RS-232.

The data logger 3 may include one or more sensors interfaces. For example, the one or more sensors interfaces may include one or more of a SDI-12 V.1.3, RS-485 (SDI-12/Modbus RTU), Pulse/Status input, Status output, or Switch output.

The data logger 3 may include one or more Input/output modules. For example, the one or more input/output modules may include one or more of a analogue inputs, analogue outputs, analogue inputs isolated, serial input module for OTT sensors, or Barometric input board.

The data logger 3 may include a one or more measuring channels, e.g., 40 or 120 measuring channels.

The data logger 3 may include one or more IP communication modules. For example, the one or more IP communication modules may include one or more of Integrated TCP/IP stack (HTTP, HTTPS, FTP, SMTP, Socket . . . ), GSM/GPRS/3G/4G, Ethernet/DSL, integrated web server, or encrypted data transmission HTTPS SSL 3.0/TLS 1.0/1.1/1.2. The data logger 3 may include one or more integrated modems, e.g. GSM/GPRS. The data logger 3 may include a RTOS operating system with power management for minimal power consumption.

The data logger 3 may include a SNTP time synchronization module. The data logger 3 may have a 9, 12 or 28 V DC power supply.

The data logger 3 may have a RAM of 4 MB, a NOR of 8 MB and a NAND flash of 256 MB. The data logger 3 may save up to 1 million values.

The data logger 3 may include a display with a graphical dot matrix of 122×32 pixels, a LED backlight and/or controlled by a job shuttle. Particularly, as shown in FIG. 1, the data logger 3 may be directly, or indirectly, operatively connected to the solar radiation measuring sensor 2 via a (first) bus or bus system 6. More particularly, if the data logger 3 is indirectly connected to the solar radiation measuring sensor 2 via the bus or bus system 6, the control unit 4 is interposed between, and operatively connected to, the solar radiation measuring sensor 2 and the data logger 3. That is to say, the control unit 4 is operatively connected to the solar radiation measuring sensor 2 via a data connection such as a (second) bus or bus system 5. Likewise, the control unit 4 is operatively connected to the data logger 3 via the (first) bus or bus system 6.

Accordingly, the measurements provided or output by the solar radiation measuring sensor 2 are used for calculating at least one average value of the solar radiation measured by the solar radiation measuring sensor 2 over a specified (predetermined or predeterminable) number of solar radiation samples. The calculated at least one average value of the solar radiation is then recorded by the data logger 3 at a specified (predetermined or predeterminable) recording rate RR. The data logger 3 may be based on a digital processor (or a computer), i.e., the data logger may be or comprise a digital data logger (DDL). The data logger 3 may be equipped with a microprocessor, an internal memory for data storage. The data logger 3 may be configured to (particularly wirelessly) communicate with a remote control unit 7. Accordingly, the data recorded by the data logger 3 may be (wirelessly) transferred to the remote unit 7 specifically in real time and/or at a specified (predetermined or predeterminable) transferring rate. The data logger 3 is configured to at least partly record at a recording rate RR an average value of the solar radiation calculated by and obtained from the control unit 4 via the (first) bus or bus system 6. The average value of the solar radiation calculated by and obtained from the control unit 4 is an average value of a specified (predetermined or predeterminable) number of solar radiation measurements that are measured by the solar radiation measuring sensor 2 and provided to the control unit 4 via the data connection such as the (second) bus or bus system 5. The control unit 4 may be integrated into the solar radiation measuring sensor 2, or it may be a different component separated from the solar radiation measuring sensor 2.

The average value of the solar radiation calculated by the control unit 4 will be described in detail hereinafter.

The recording rate RR of the data logger 3 corresponds to the number of times in which the data logger 3 is configured to record the data provided by the control unit 4, i.e., the average values of the solar radiation, or by the solar radiation measuring sensor 2, i.e., the solar radiation measurements. In other words, the data logger 3 may be configured to record the average values of the solar radiation, or the solar radiation measurements, at a specified (predetermined or predeterminable) frequency.

The frequency at which the data logger 3 records the average values of the solar radiation is the number of recording per unit of time, e.g., recording per second/minute. Particularly, the recording rate of the data logger 3 may be lower than about 1 Hz (1 record per second), more particularly lower than about 0.1 Hz (1 record every 10 seconds).

The recording rate RR of the data logger 3 specifically may depend on the internal memory of the same data logger 3 for the data storage, and/or on the connection (the (first) bus or bus system 6) between the data logger 3 and the solar radiation measuring sensor 2 and/or the control unit 4. In other words, the recording rate RR of the data logger 3 is limited by the internal memory of the same data logger 3 for the data storage, and/or by the bandwidth of the connection (the (first) bus or bus system 6) between the data logger 3 and the solar radiation measuring sensor 2, and/or the control unit 4.

The recording rate RR of the data logger 3 may be specified, i.e. predetermined or predeterminable. Particularly, the recording rate RR of the data logger 3 may be adjustable. In other words, the recording rate RR of the data logger 3 may be set, i.e., increased and/or decreased by the user between a minimum fixed recording rate and a maximum fixed recording rate. Alternatively, the recording rate RR of the data logger 3 may be fixed at a specified (predetermined or predeterminable) rate.

Particularly, the recording rate RR of the data logger 3 may be lower than the measuring rate MR of the solar radiation measuring sensor 2. In other words, the data logger 3 may be configured to record a lower number of average values of the solar radiation over a period of time, than the number of measurements measured by the solar radiation measuring sensor 2 over the same period of time.

With reference to FIG. 1, the system for measuring the solar radiation 1 comprises the control unit 4. The control unit 4 may be a controller. Particularly, the control unit 4 may be a microcontroller. Specifically, the control unit 4 may be a micro-computer on a single metal-oxide-semiconductor (MOS) integrated circuit (IC) chip. The control unit 4 contains one or more CPUs (processor cores) along with memory and programmable input/output peripherals. Program memory in the form of ferroelectric RAM, NOR flash or OTP ROM is also included on chip, as well as a small amount of RAM.

As shown in FIG. 1, the control unit 4 is operatively connected to the solar radiation measuring sensor 2 via a (second) bus or bus system 5, and to the data logger 3 by a (first) bus or bus system 6.

The data communications protocol of the (first) bus or bus system 6 between the solar radiation measuring sensor 2 and the data logger 3, and/or the control unit 4 and the data logger 3 may be a "Modbus" data communications protocol. The Modbus data communications protocol uses specifically character serial communication lines, Ethernet, or the Internet protocol suite as a transport layer and particularly supports communication to and from multiple devices connected to the same cable or Ethernet network. For example, Modbus RTU (Remote Terminal Unit) may be used as a serial communication and specifically adopts a compact, binary representation of the data for protocol communication, wherein the RTU format of Modbus specifically follows the commands/data with a cyclic redundancy check checksum as an error check mechanism to ensure the reliability of data. However, other Modbus data communications protocol may be considered such as Modbus TCP/IP or Modbus TCP, Modbus over TCP/IP or Modbus over TCP or Modbus RTU/IP, Profibus, or the like.

Particularly, the Profibus may be a Profibus PA. The Profibus PA (Process Automation) may be used to monitor measuring equipment via a process control system in process automation applications. The Profibus PA may have a data transmission rate of 31.25 kbit/s.

The control unit 4 is configured to calculate, based on a selectable averaging function, at least one average value of the solar radiation measured by the solar radiation measuring sensor 2 over a specified (predetermined or predeterminable) number of solar radiation samples. The solar radiation samples correspond to the solar radiation measurements measured by the solar radiation measuring sensor 2 at the measuring rate MR. Particularly, the specified number of solar radiation samples may be predetermined, or predeterminable.

Particularly, the average value calculated by the control unit 4 may be calculated over a fixed number of solar radiation measurements, or over a variable number of solar radiation measurements. That is, the average value calculated by the control unit 4 may be calculated over a fixed averaging time range, or over a variable averaging time range.

Alternatively, the control unit 4 is configured to calculate based on a specified (predetermined or predeterminable) averaging function at least one average value of the solar radiation measured by the solar radiation measuring sensor 2 over a specified (predetermined or predeterminable) number of solar radiation samples. In other words, the averaging function according to which the average value is calculated may be pre-set, and the control unit 4 is configured to determine the recording rate RR of the data logger 3 and further configured to modify one or more parameters of the specified averaging function for calculating the average value based on the recording rate RR of the data logger 3. Particularly, the control unit 4 may be configured to modify the averaging or integration time of the specified averaging function, i.e., the time interval over which the average value is calculated. The solar radiation samples correspond to the solar radiation measurements measured by the solar radiation measuring sensor 2 at the measuring rate MR. Particularly, the specified number of solar radiation samples may be predetermined, or predeterminable.

The selectable averaging function, or the specified averaging function, may be one or more of the following averaging functions: a true averaging function, a moving averaging function, and/or an exponential averaging function of the solar radiation measured by the solar radiation measuring sensor 2 over a specified (predetermined or predeterminable) time frame.

More particularly, if the selected (or specified) averaging function is a true averaging function, the average value is calculated as follows:

$$AV = \frac{R1 + R2 + \ldots + Rn}{N}$$

wherein:
AV: average value;
R1, R2, ..., Rn: solar radiation samples;
n: total number of samples;
N: representative value.

If the selected (or specified) averaging function is a moving averaging function, the average value is calculated as follows:

$$AV_k = \frac{R_{n-k+1} + R_{n-k+2} + \ldots + R_n}{k}$$

wherein:
AV: average value;
Ri: the solar radiation measurement;
k: number of the last considered solar radiation samples (sampling width);
n: total number of solar radiation samples.

The next average value $AV_k$, next is then calculated with the same sampling width k and considering the range from n−k+2 to n+1.

If the selected (or specified) averaging function is an exponential averaging function, the average value calculated by the control unit is the following:

$$AV_t = \begin{cases} R_1, & t = 1 \\ \alpha R_t + (1 - \alpha) \cdot AV_{t-1}, & t > 1 \end{cases}$$

wherein:
$AV_t$: value of the exponential moving average at any time period t;
$R_i$: is the solar radiation value at a time period ti;
α: is the coefficient representing the degree of weighting decrease and is a constant smoothing factor varying between 0 and 1.

The control unit 4 specifically is configured to determine the recording rate RR of the data logger 3 and further configured to select the selectable averaging function from a plurality of averaging functions for calculating the average value based on the recording rate RR of the data logger 3, i.e., the recording rate RR at which the data logger 3 is set. In other words, the control unit 4 may be configured to firstly determine at which recording rate RR the data logger 3 is configured to, or can, record, i.e., at which recording rate RR the data logger 3 is set.

Subsequently, the control unit 4 is configured to select the selectable averaging function from the plurality of averaging functions for calculating the average value based on the recording rate RR of the data logger 3. In other words, the specific averaging function by which at least one average value of the solar radiation is calculated, is selected by the control unit 4 based on the recording rate RR of the data logger 3.

Particularly, if the recording rate RR of the data logger 3 is substantially lower than the measuring rate MR of the solar radiation measuring sensor 2, the control unit 4 firstly determines at which recording rate RR the data logger 3 is recording, i.e., at which recording rate RR the data logger 3 is set, and then selects one or more of the selectable averaging function from a plurality of averaging functions for calculating at least one average value of the solar radiation. Alternatively, if the recording rate RR of the data logger 3 is substantially equal to (or greater than) the measuring rate MR of the solar radiation measuring sensor 2, the data logger 3 is configured to directly record (i.e. without an averaging function) at least one of the solar radiation samples measured by the solar radiation measuring sensor 2.

For example, if the recording rate RR of the data logger 3 is equal to about 0.1 second, and the measuring rate MR of the solar radiation measuring sensor 2 is lower than, or substantially equal to, the recording rate RR of the data logger 3, the average value corresponds to the most recent measurement value, i.e., the data logger 3 is configured to directly record (i.e. without an averaging function) at least one of the solar radiation samples measured by the solar radiation measuring sensor 2.

If the recording rate RR of the data logger 3 is equal to about 0.1 second, and the measuring rate MR of the solar radiation measuring sensor 2 is greater than the recording rate RR of the data logger 3, the average value is calculated according to the true average function.

Further for example, if the recording rate RR of the data logger 3 is equal to about 1 second, and the measuring rate MR of the solar radiation measuring sensor 2 is lower than, or substantially equal to, the recording rate RR of the data logger 3, the average value corresponds to the most recent measurement value, i.e., the data logger 3 is configured to directly record (i.e. without applying an averaging function) at least one of the solar radiation samples measured by the solar radiation measuring sensor 2.

If the recording rate RR of the data logger 3 is equal to about 1 second, and the measuring rate MR of the solar radiation measuring sensor 2 is substantially greater than the recording rate RR of the data logger 3, the average value is calculated according to the true average function over a time frame (averaging or integration time) equal to about 1 second. Alternatively, the average value may be calculated according to the exponential averaging function if a quick response is needed.

Further for example, if the recording rate RR of the data logger 3 is equal to about 10 seconds, and the measuring rate MR of the solar radiation measuring sensor 2 is lower than, or substantially equal to, the recording rate RR of the data logger 3, the average value corresponds to the most recent measurement value, i.e., the data logger 3 is configured to directly record (i.e. without applying an averaging function) at least one of the solar radiation samples measured by the solar radiation measuring sensor 2.

If the recording rate RR of the data logger 3 is equal to about 10 seconds, and the measuring rate MR of the solar radiation measuring sensor 2 is substantially greater than the recording rate RR of the data logger 3, the average value is calculated according to the true average function over a time frame (averaging or integration time) equal to about 10 seconds. Alternatively, the average value may be calculated according to the exponential averaging function if a quick response is needed. Further for example, if the recording rate RR of the data logger 3 is equal to about 60 seconds, and the measuring rate MR of the solar radiation measuring sensor 2 is lower than, or substantially equal to, the recording rate RR of the data logger 3, the average value corresponds to the most recent measurement value, i.e., the data logger 3 is configured to directly record (i.e. without applying an averaging function) at least one of the solar radiation samples measured by the solar radiation measuring sensor 2.

If the recording rate RR of the data logger 3 is equal to about 60 seconds, and the measuring rate MR of the solar radiation measuring sensor 2 is substantially greater than the recording rate RR of the data logger 3, the average value is calculated according to the true average function over a time frame (averaging or integration time) equal to about 60 seconds. Alternatively, the average value may be calculated according to the exponential averaging function if a quick response is needed.

In connection with the above disclosed alternative, the wording "the measuring rate MR of the solar radiation measuring sensor 2 is substantially equal to the recording rate RR" means that the measuring rate MR is equal to the recording rate RR within a certain specified error, e.g., ±2%.

The control unit 4 may be further configured to calculate a standard deviation value of the solar radiation over a specified (predetermined or predeterminable) number of solar radiation samples (specified time range).

Particularly, the control unit 4 calculate the standard deviation value of the solar radiation over a specified (predetermined or predeterminable) number of solar radiation samples, when the solar radiation measured by the solar radiation measuring sensor 2 exceeds a specified (predetermined or predeterminable) value. The specified value may be e.g. about 1362 W/m$^2$±3%. Alternatively, the specified value may be about a·1362 W/m$^2$, wherein a=0.6-1.2.

Particularly, when the solar radiation measured by the solar radiation measuring sensor 2 exceeds this specified (predetermined or predeterminable) value a spike in the measured solar radiation may have occurred. The specified number of solar radiation samples on which the standard deviation value is calculated may be determinable or predeterminable. The specified (predetermined or predeterminable) value of the solar radiation may be determinable or predeterminable.

Particularly, the control unit 4 may be further configured to emit or provide a general signal when the solar radiation measured by the solar radiation sensor exceeds the specified (predetermined or predeterminable) value. Accordingly, the signal may inform a user that a spike in the measuring of the solar radiation has been recorded. For example, the control unit 4 may be operatively connected with a remote unit, e.g., a personal computer or a smartphone, such that the general signal indicating the occurrence of a solar radiation spike may be received by the user.

Particularly, when the solar radiation measured by the solar radiation measuring sensor exceed the specified (predetermined or predeterminable) value, the control unit 4 may be further configured to determine a number of solar radiation samples exceeding the specified value over a specified (predetermined or predeterminable) time period.

The system for measuring the solar radiation 1 may be integrated into a pyranometer 100.

Figure 2:
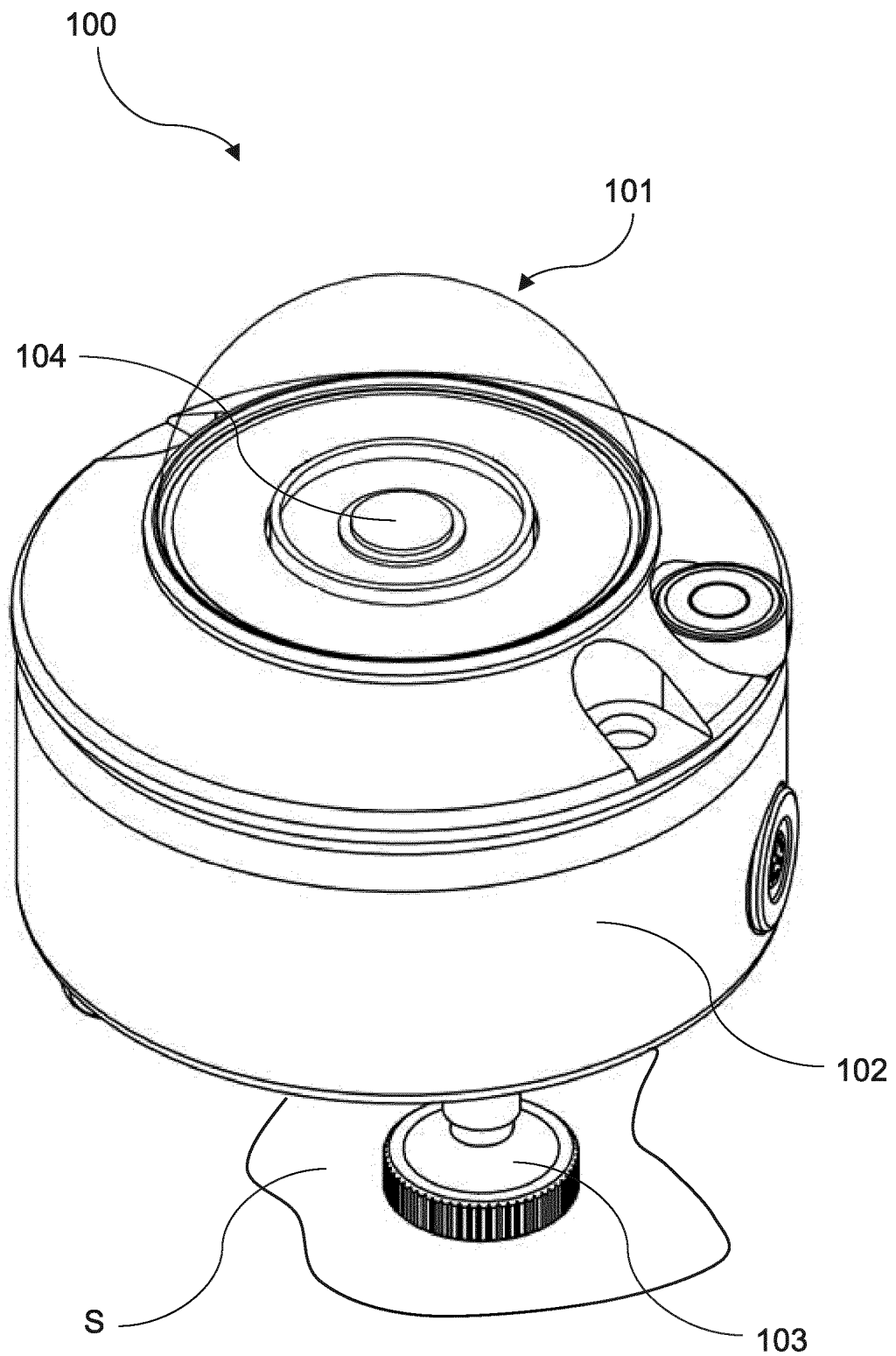
FIG. 2, is an axonometric view of the pyranometer for measuring the solar radiation.

Another aspect of the present disclosure relates to a pyranometer 100, an embodiment of which is shown in FIG. 2.

The pyranometer 100 comprises a dome 101. The dome 101 may be a light-transparent dome. The dome 101 may be configured to allow a solar radiation to pass through the dome 101.

Particularly, the dome 101 may be a dome configured to limit the spectral response from 190 to 4000 nanometers (nm), preferably from 300 to 2,800 nanometers, while preserving the 180° field of view. The transparency of the light-transparent dome 101 may be particularly such that at least about 60%, more particularly at least about 70% of the incident light in the relevant spectral range may pass therethrough. In other words, the dome 101 is configured to allow a solar radiation to be transmitted from the environment external to the pyranometer 100, through an outer surface of the dome, through the material forming the light-transparent dome, and through an inner surface, in an inner cavity of the pyranometer 100 where the solar radiation measuring sensor 2 is located.

Accordingly, the dome 101 may be made of any suitable transparent material that allows the transmission of a solar radiation therethrough. Particularly, the dome 101 may be made of a material having such physical/chemical characteristics so as to protect the measurement surface of the pyranometer 100 yet at the same time being transparent to (most) of the light (at least partially transparent for a spectrum of solar radiation the pyranometer 100 is intended to detect).

For example, the dome 101 may be made of glass. Alternatively, the dome 1 may be made of a transparent thermoplastic polymeric material, i.e. poly(methyl methacrylate) (PMMA) also known as acrylic, acrylic glass, or plexiglass. Particularly, the dome 101 may be dome-shaped.

Particularly, the dome 101 may have a substantially hemispherical hollow shape. As above disclosed, the dome 101 comprises the outer surface and the inner surface, wherein the inner surface is opposite to the outer surface. Stated differently, when the dome 101 is mounted on the pyranometer 100, the outer surface is exposed (faces) to the environment external to the pyranometer 100. In contrast, the inner surface is exposed (faces) the cavity. The outer surface and the inner surface may be preferably shaped to have a have a substantially semi-spherical hollow shape.

Referring to FIG. 2, the pyranometer 100 comprises a pyranometer housing 102. The pyranometer housing 102 may be or may comprise a container configured to contain the components of the pyranometer 100, e.g. the solar radiation measuring sensor 2, and the control unit 4. The data logger 3 is external to the pyranometer 100 but operatively connected or connectable to the same, particularly to the control unit 4 and/or to the solar radiation measuring sensor 2, via the (second) bus or bus system 5 and/or via the (first) bus or bus system 6, respectively.

The pyranometer housing 102 may be provided with one or more levelling feet 103 for supporting the pyranometer housing 102, e.g., on a ground surface S. The pyranometer housing 102 comprises an inner chamber. The chamber is particularly configured to contain at least the following components of the pyranometer 100: a solar radiation measuring sensor 2, a light-transparent diffusor 104, and the control unit 4.

Particularly, the solar radiation measuring sensor 2, and the control unit 4 may be removably or permanently located in the chamber of the pyranometer housing 102, for example on a bottom surface of the chamber. The chamber also comprises an opening that is located opposite to the bottom surface. The opening may have a substantially circular shape as the bottom surface of the chamber. The light-transparent diffusor 4 may be arranged in the opening of the chamber so as to diffuse the solar radiation on the receiving surface 20 of the solar radiation measuring sensor 2.

The pyranometer 100 comprises the solar radiation measuring sensor 2 and control unit 4.

As above described with respect to the system 1, the solar radiation measuring sensor 2 of the pyranometer 100 is configured to measure a solar radiation at a measuring rate MR. The solar radiation measuring sensor 2 of the pyranometer 100 particularly is configured and/or comprises the same features and arrangement of the solar radiation measuring sensor 2 as described above with respect to the system 1 for measuring the solar radiation.

The control unit 4 of the pyranometer 100 is operatively connectable to the solar radiation measuring sensor 2 via the (second) bus or bus system 5, and/or to the data logger 3 via the (first) bus or bus system 6.

Particularly, the data logger 3 is an electronic device that is configured to record solar radiation measurements data, over time. The data logger 3 of the pyranometer 100 particularly is configured and/or comprises the same particular features, aspects and arrangements of the data logger 3 as described above with respect to the system 1 for measuring the solar radiation.

The control unit 4 of the pyranometer 100 is configured to calculate based on a selectable averaging function at least one average value of the solar radiation measured by the solar radiation measuring sensor 2 over a specified (predetermined or predeterminable) number of solar radiation samples.

The control unit 4 of the pyranometer 100 is configured to determine the recording rate RR of the data logger 3 and further configured to select the selectable averaging function from a plurality of averaging functions for calculating the average value based on the recording rate RR of the data logger 3.

Alternatively, the control unit 4 may be configured to calculate based on the specified averaging function at least one average value of the solar radiation measured by the solar radiation measuring sensor over a specified (predetermined or predeterminable) number of solar radiation samples, and wherein the control unit is configured to determine the recording rate of the data logger and further configured to modify one or more parameters of the specified (predetermined or predeterminable) averaging function for calculating the average value based on the recording rate RR of the data logger 3.

The control unit 4 of the pyranometer 100, particularly the averaging functions selectable by the control unit 4, or the specified averaging function, is configured and comprises the same particular features, aspects and arrangements of the control unit 4 as described above with respect to the system 1 for measuring the solar radiation.

Figure 3:
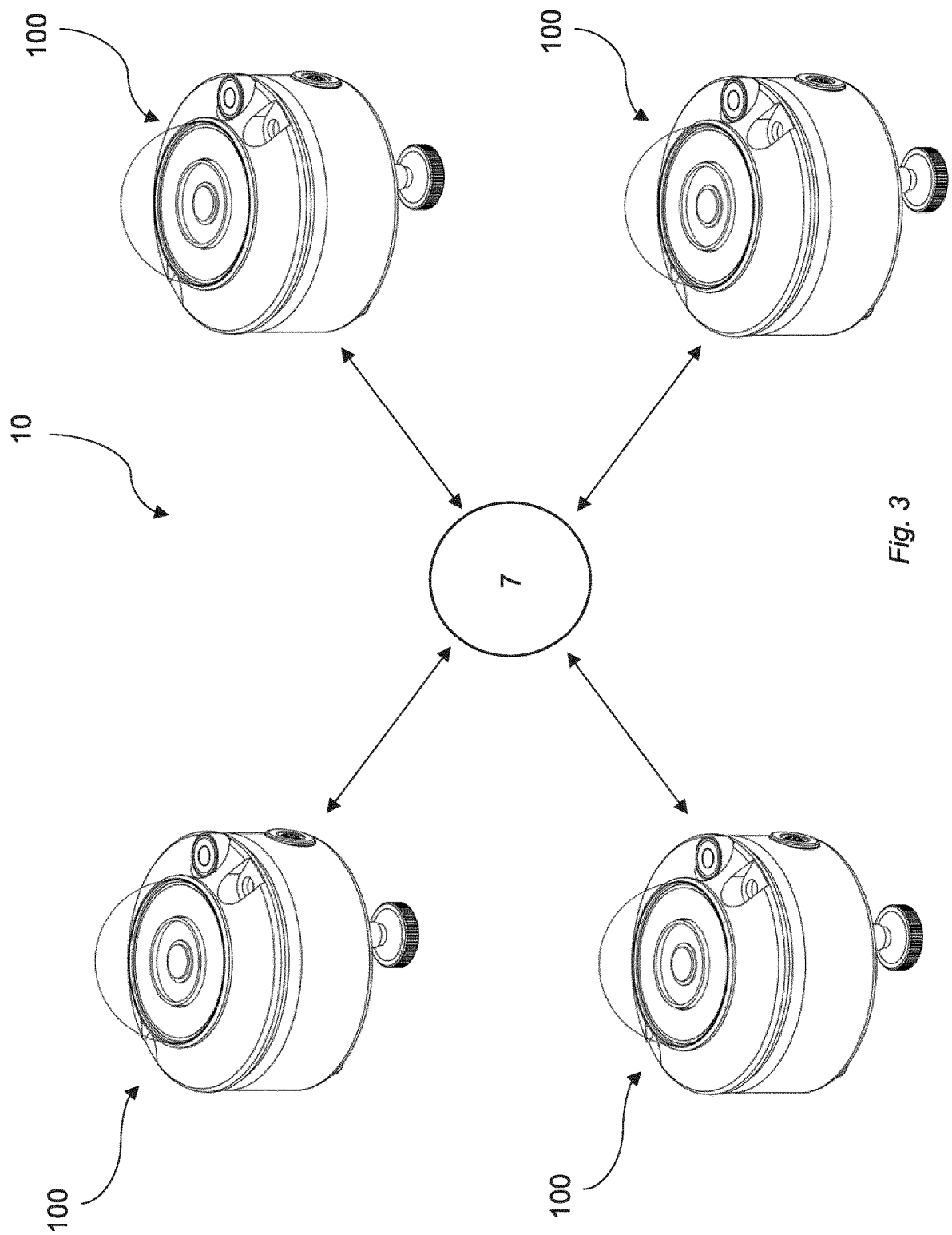
FIG. 3, is a schematic view of a network of pyranometers and a remote control unit according to an embodiment.

With reference to FIG. 3, a network 10 of pyranometers is described hereinafter. Particularly, the network 10 of pyranometers comprises one or more pyranometers 100 as above described with reference to FIG. 2. Each of the one or more pyranometers 100 is operatively connected to the corresponding data logger 3. The data logger 3 is configured to (particularly wirelessly) communicate with the remote-control unit 7. Accordingly, the solar radiation measurements output by the pyranometer 100 are or can be recorded or logged by the data logger 3. The data logger 3 may be configured to (particularly wirelessly) transfer data, i.e., the averaged solar radiation measurements averaged based on the selected averaging function, to the remote control unit 7. The transfer of data between the data logger 3 and the remote control unit 7 may be in real time and/or at a specified (predetermined or predeterminable) transferring rate.

Figure 5:
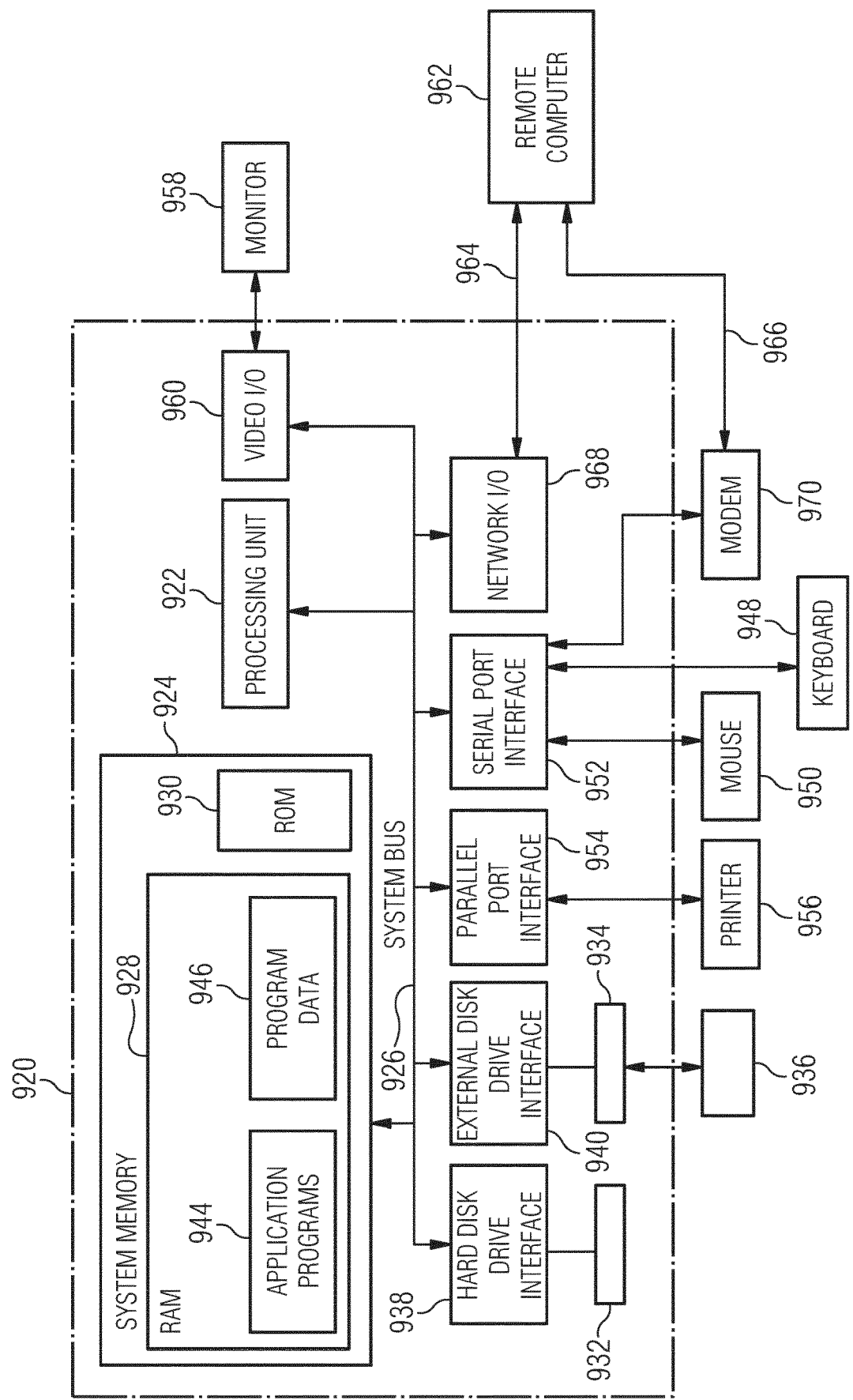
FIG. 5 shows an exemplary remote-control unit comprising a general-purpose computing device.

With reference to FIG. 5, the remote-control unit 7 may be or comprise a general-purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random-access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The remote-control unit 7, e.g., the personal computer 920, may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the personal computer 920. The data structures may include relevant data for the implementation of computer readable instructions. The relevant data may be organized in a database, for example a relational database management system or an object-oriented database management system.

Although the environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946.

A user may enter commands and information, as discussed below, into the remote-control unit 7, e.g., the personal computer 920, through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The remote control unit 7 specifically in the form of a computing environment 920 is configured to wirelessly communicate with the one or more pyranometers 100, and/or with one or more further remote computing devices 962. To communicate, the remote-control unit 7 may operate in a networked environment using connections to one or more electronic devices. The one or more further remote computing devices may be another computing environment such as a server, a router, a network PC, a peer device or other common network node. The logical connections between the remote control unit 7, the one or more pyranometers 100, and/or the one or more further computing devices 962 include a local area network (LAN) 964 and a wide area network (WAN) 966. Such networking environments are commonplace in offices, enterprise-wide computer networks, intranets and the Internet and may particularly be encrypted.

When used in a LAN networking environment, the remote control unit 7 may be connected to the LAN 964 through a network I/O 968. When used in a WAN networking environment, the remote control unit 7 may include a modem 970 or other means for establishing communications over the WAN 966. The modem 970, which may be internal or external to remote control unit 7, is connected to the system bus 926 via the serial port interface 952. In a networked environment, program modules depicted relative to the computing environment 920, or portions thereof, may be stored in a remote memory storage device resident on or accessible to remote computer 962.

Advantageously, the highly accurate data that are obtained by solar radiation measuring sensor 2 and elaborated by the control unit 4 of the pyranometer 100, i.e., the averaged solar radiation measurements, are wirelessly transferred by the one or more pyranometers 100 to the remote control unit 7. By means of the remote control unit 7, the user may monitor and/or further elaborate the solar radiation measurements provided by each pyranometer 100. Additionally, the occurrence of spikes in the solar radiation may be accurately detected in real time.

Figure 4:
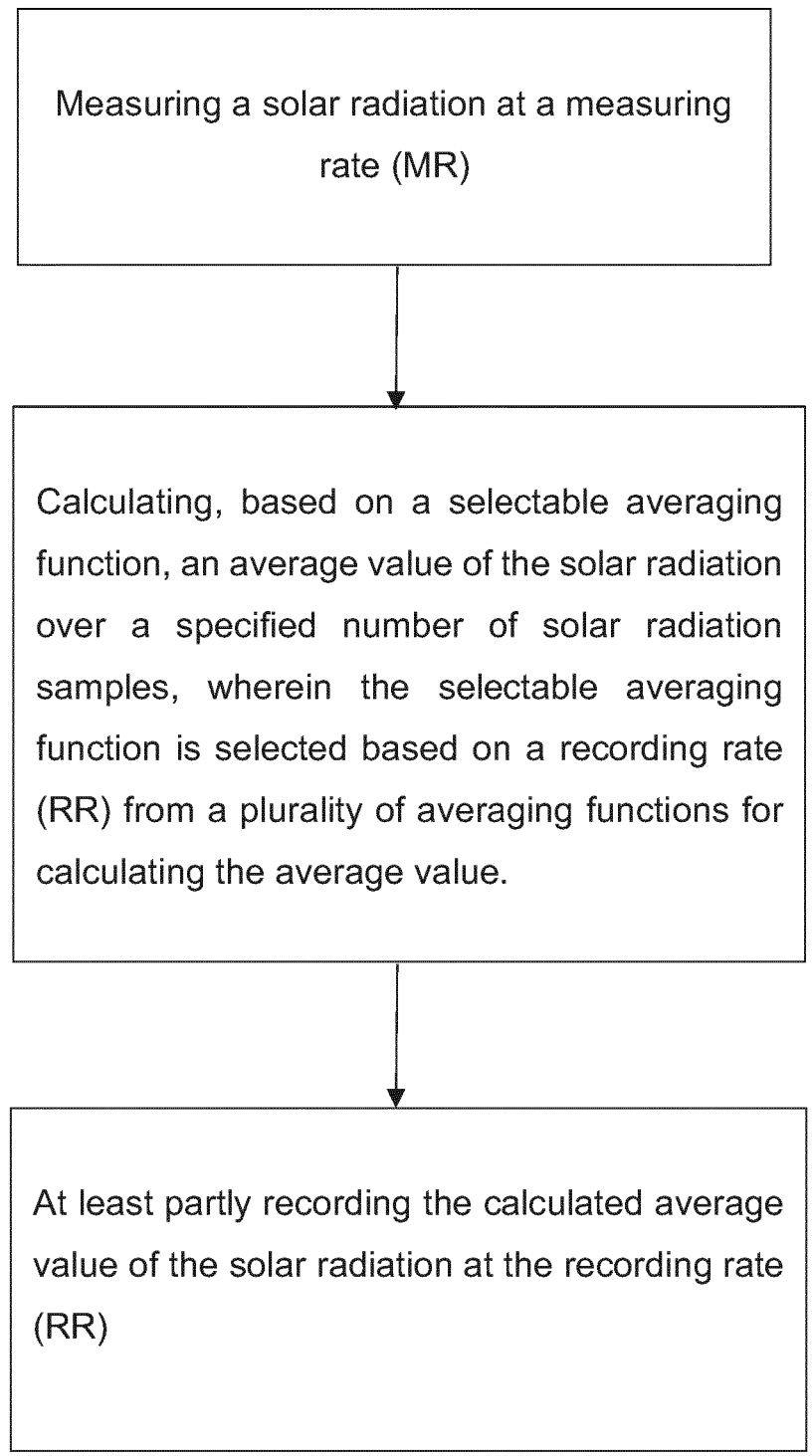
FIG. 4, is a flowchart illustrating a method for measuring the solar radiation according to an embodiment.

With reference to FIG. 4, an example of a method of measuring the solar radiation is described hereinafter.

The method of measuring a solar radiation comprises a step of measuring the solar radiation at a measuring rate MR by means of one or more solar radiation measuring sensors 2. In other words, according to the present method, the measuring of the solar radiation is carried out at a specified (predetermined or predeterminable) measuring rate MR.

As above described with respect to the system 1 and with respect to the pyranometer 100, the measuring rate MR is the number of times in which the solar radiation is measured by the solar radiation measuring sensor 2 in a specified (predetermined or predeterminable) time period. In other words, according to the present method, the solar radiation is measured at a specified (predetermined or predeterminable) frequency. Particularly, the frequency at which the solar radiation is measured is the number of measurements per unit of time, e.g., measurements per second. Particularly, the measuring rate MR of the solar radiation measuring sensor 2 may be greater than about 2 Hz. In other words, a single measurement of the solar radiation is carried out every specified (predetermined or predeterminable) time period that is lower than about 0.5 seconds (2 measurements per second), particularly lower than about 0.2 seconds (5 measurements per second). The measuring rate MR may be constant.

Particularly, the measuring rate MR may be greater than about 50 Hz. In other words, a measurement of the solar radiation may be provided in a time period that is lower than about 0.02 seconds (50 measurements per second).

With reference to FIG. 4, the method of measuring a solar radiation further comprises a step of at least partly recording by means of the data logger 3 the calculated average value of the solar radiation at a recording rate (RR). Particularly, firstly, the average value of the solar radiation is calculated over the previously measured solar radiation measurements (solar radiation samples) by applying one or more of the above described selectable averaging functions. Particularly, the one or more averaging functions is selected based on the recording rate RR at which the average value of the solar radiation will be then recorded. More particularly, as above described with respect to the system 1 and to the pyranometer 100, the measurements of the solar radiation are used for calculating at least one average value of the solar radiation over a specified (predetermined or predeterminable) number of solar radiation samples. The calculated at least one average value of the solar radiation is then recorded at the specified (predetermined or predeterminable) recording rate RR. The recording rate RR corresponds to the number of times in which the average values of the solar radiation are recorded. In other words, the average values of the solar radiation are recorded at a specified (predetermined or predeterminable) frequency. The frequency at which the average values of the solar radiation are recorded is the number of recording per unit of time, e.g., recording per second or recording per minute. Particularly, the recording rate RR may be lower than about 1 Hz (1 record per second), more particularly lower than about 0.1 Hz (1 record every 10 seconds).

The recording rate RR may be specified, i.e. predetermined or predeterminable. Particularly, the recording rate RR may be adjustable. In other words, the recording rate RR may be set, i.e., increased and/or decreased by the user between a minimum fixed recording rate and a maximum fixed recording rate. Particularly, the recording rate RR may be fixed at a specified (predetermined or predeterminable) rate.

Particularly, the recording rate RR may be lower than the measuring rate MR. In other words, a lower number of average values of the solar radiation may be recorded over a period of time, than the number of measurements of the solar radiation over the same period of time.

Still referring to FIG. 4, the method of measuring a solar radiation further comprises a step of calculating, based on the selectable or selected averaging function, the average value of the solar radiation over a specified (predetermined or predeterminable) number of solar radiation samples, wherein the selectable or selected averaging function (particularly previously) is selected based on the recording rate RR from a plurality of averaging functions for calculating the average value of the solar radiation.

Particularly, based on a selectable averaging function, at least one average value of the solar radiation is calculated over a specified (predetermined or predeterminable) number of solar radiation measurement samples. The solar radiation samples correspond to the solar radiation measurements measured at the measuring rate MR. Particularly, the number of solar radiation samples may be predetermined, or predeterminable.

Alternatively, the step of calculating the average value may be based on a specified (predetermined or predeterminable) averaging function, such that an average value of the solar radiation is calculated over a specified (predetermined or predeterminable) number of solar radiation samples. Moreover, the method comprises a step of at least partly recording the calculated average value of the solar radiation at a recording rate, and a step of determining the recording rate. Furthermore, the method comprises a step of modifying one or more parameters of the specified (predetermined or predeterminable) averaging function for calculating the average value based on the recording rate. Particularly, the (modified) one or more parameters of the specified (predetermined or predeterminable) averaging function for calculating the average value may be the averaging or integration time. The average value may be calculated over a fixed number of solar radiation measurements, or over a variable number of solar radiation measurements. That is, the average value may be calculated over a fixed averaging time range, or over a variable averaging time range.

As above described with respect to the system 1 and to the pyranometer 100, the selectable (specified) averaging function may be one or more of the following averaging functions: the true averaging function, the moving averaging function, and/or the exponential averaging function of the solar radiation measurements over a specified (predetermined or predeterminable) time frame.

More particularly, if the selected (specified) averaging function is the true averaging function, the average value is calculated as follows:

$$AV = \frac{R1 + R2 + \ldots + Rn}{N}$$

wherein:
AV: average value;
R1, R2, . . . , Rn: solar radiation samples;
n: total number of samples;
N: representative value.

If the selected (specified) averaging function is the moving averaging function, the average value is calculated as follows:

$$AV_k = \frac{R_{n-k+1} + R_{n-k+2} + \ldots + R_n}{k}$$

wherein:
AV: average value;
Ri: the solar radiation measurement;
k: number of the last considered solar radiation samples (sampling width);
n: total number of solar radiation samples.

The next average value $AV_{k,\,next}$ is then calculated with the same sampling width k and considering the range from n−k+2 to n+1.

If the selected (specified) averaging function is the exponential averaging function, the average value is calculated by the control unit 4 as follows:

$$AV_t = \begin{cases} R_1, & t = 1 \\ \alpha R_t + (1-\alpha) \cdot AV_{t-1}, & t > 1 \end{cases}$$

wherein:
$AV_t$: value of the exponential moving average at any time period t;
$R_t$: is the solar radiation value at a time period ti;
α: is the coefficient representing the degree of weighting decrease and is a constant smoothing factor varying between 0 and 1.

According to the present method, before the solar radiation average value is calculated, the recording rate RR is determined. Once the recording rate RR is determined, one or more of the selectable averaging function are selected from a plurality of averaging functions for calculating the average value based on the recording rate RR, i.e., the recording rate RR at which the solar radiation average values will be recorded. In other words, firstly the recording rate RR is determined, i.e., at which recording rate RR the average values are recorded.

Subsequently, one or more of the selectable averaging function are selected from the plurality of averaging functions for calculating the average value based on the recording rate RR. In other words, the specific averaging function by which at least one average value of the solar radiation is calculated, is selected based on the recording rate RR, i.e., the recording rate of the data logger 3.

Particularly, if the recording rate RR is substantially lower than the measuring rate MR, firstly, the specific recording rate RR is determined, and then one or more of the selectable averaging function are selected from a plurality of averaging functions for calculating at least one average value of the solar radiation.

The method of measuring a solar radiation may further comprises a step of calculating the standard deviation value of the solar radiation over a specified (predetermined or predeterminable) number of solar radiation samples, when the measured solar radiation exceeds a specified (predetermined or predeterminable) value. The specified value may be e.g. about 1367 $W/m^2 \pm 3\%$. Particularly, when the measured solar radiation exceeds this specified value, a spike in the measured solar radiation may have occurred. The number of solar radiation samples on which the standard deviation value is calculated may be determinable or predeterminable. The specified value of the solar radiation may be determinable or predeterminable.

Particularly, the general signal may be emitted when the measured solar radiation exceeds the specified (predetermined or predeterminable) value. Accordingly, the signal may inform a user that a spike in the measuring of the solar radiation has been recorded. For example, the signal may be sent to the remote control unit 7, e.g., a personal computer or a smartphone, such that the general signal indicating the occurrence of a solar radiation spike may be received, detected and/or further elaborated by the user.

Further particularly, when the measured solar radiation exceeds the specified value, a number of solar radiation samples exceeding the specified value over a specified (predetermined or predeterminable) time period may be determined.

According to another aspect, a computer program product (particularly tangibly embodies in a computer storage device) is provided, wherein the computer program product comprises computer-readable instructions which, when loaded and executed on a suitable system, perform the steps of a method of measuring the solar radiation, as above described.

According to another aspect, the system 1 for measuring the solar radiation described above may be alternatively configured as follows.

Particularly, the control unit 4 may be configured to determine a recording rate RR of the data logger 3, the measuring rate MR of the solar radiation measuring sensor 2, and a time constant TC of the solar radiation measuring sensor. Particularly, the time constant TC of the solar radiation measuring sensor is a parameter characterizing the response to a step input of a first-order, linear time-invariant (LTI) system (solar radiation measuring sensor), i.e., the time constant TC is the main characteristic unit of a first-order LTI system (solar radiation measuring sensor). Stated differently, the time constant TC of the solar radiation measuring sensor 2 is the amount of time for the solar radiation measuring sensor 2 to respond to a rapid change in a measuring process until it is measuring values within the accuracy tolerance expected from the solar radiation sensor 2.

If the time constant TC of the solar radiation measuring sensor 2 is substantially greater than the measuring rate MR of the solar radiation measuring sensor 2 and/or if the time constant TC of the solar radiation measuring sensor 2 is substantially greater than the recording rate RR of the data logger 3, the control unit 4 is further configured to modify at least one solar radiation value provided by the solar radiation measuring sensor 2 at the measuring rate MR. The data logger 3 is configured to at least partly record the at least one solar radiation value modified by the control unit 4.

Advantageously, if the solar radiation time constant TC is substantially greater than the measuring rate MR of the solar radiation measuring sensor 2 as well as of the recording rate RR of the data logger 3, the control unit 4 is configured to apply a "fast response filter", i.e., the control unit 4 is configured to modify the solar radiation value output from the solar radiation measuring sensor 2 and that is subsequently recorded on the data logger 3. Advantageously, an equivalent solar radiation value that accurately represents the measured solar radiation in the past time frame can be recorded by the data logger 3. That it to say, the (modified) solar radiation value that is recorded by the data logger 3 closely follows the instant solar irradiance such that a solar radiation equivalent value accurately representing the measured solar radiation in the past time frame is provided and, then, recorded. Accordingly, the accuracy of data obtained from the solar radiation system is enhanced.

The aspects related to the solar radiation sensor 2, the data logger 3, and the control unit 4 as described in connection with the above aspects of the present invention, apply mutatis mutandis to the present aspect of the invention, i.e., a control unit 4 provided with a fast response filter.

Particularly, the modified solar radiation value (YN) is calculated as:

$$Y_n = X_n + Kd \cdot (X_{n-1} - X_{n-2})$$

whereas
$Y_n$ is the modified solar radiation value "DfCounts" of the filter at $t=t_n$;
$X_n$ is the last solar radiation value at $t=t_n$;
$X_{n-1}$ is the previous solar radiation value at $t=t_{n-1}$;
Kd is the fast response filter constant or the acceleration factor.

Advantageously, in order to reduce the noise of the delta value ($X_{n-1}-X_{n-2}$), a simple moving average filter can be applied when calculating the modified solar radiation value.

According to another aspect, the pyranometer 100 described above may be alternatively configured as follows. The pyranometer 100 may comprise a solar radiation measuring sensor 2 configured to measure a solar radiation at a measuring rate MR, and a control unit 4 operatively connectable to the solar radiation measuring sensor 2 and to a data logger 3. The control unit 4 may be configured to determine a recording rate RR of the data logger 3, the measuring rate MR of the solar radiation measuring sensor 2, and a time constant TC of the solar radiation measuring sensor 2. If the time constant TC of the solar radiation measuring sensor 2 is substantially greater than the measuring rate MR of the solar radiation measuring sensor 2 and/or if the time constant TC of the solar radiation measuring sensor 2 is substantially greater than the recording rate RR of the data logger 3, the control unit 4 is further configured to modify at least one solar radiation value provided by the solar radiation measuring sensor 2 at the measuring rate MR, and wherein the data logger 3 is configured to at least partly record the at least one solar radiation value modified by the control unit 4.

Particularly, the modified solar radiation value (YN) is calculated as:

$$Y_n = X_n + Kd \cdot (X_{n-1} - X_{n-2})$$

whereas
$Y_n$ is the modified solar radiation value "DfCounts" of the filter at $t=t_n$;
$X_n$ is the last solar radiation value at $t=t_n$;
$X_{n-1}$ is the previous solar radiation value at $t=t_{n-1}$;
Kd is the fast response filter constant or the acceleration factor.

According to another aspect, there is provided a method of measuring a solar radiation comprising:
  measuring a solar radiation at a measuring rate MR with a solar radiation measuring sensor 2, the solar radiation measuring sensor 2 having a solar radiation measuring sensor time constant TC;
  at least partly recording at least one solar radiation value at a recording rate RR;
  determining the solar radiation measuring sensor time constant TC, the recording rate RR, and the measuring rate MR;
  wherein, if the time constant TC of the solar radiation measuring sensor 2 is substantially greater than the measuring rate MR and/or if the time constant TC of the solar radiation measuring sensor 2 is substantially greater than the recording rate RR, further modifying the at least one solar radiation value; and
  at least partly recording the modified at least one solar radiation value.

Particularly, modifying the at least one solar radiation value comprises calculating the modified solar radiation value (YN) as:

$$Y_n = X_n + Kd \cdot (X_{n-1} - X_{n-2})$$

whereas
$Y_n$ is the modified solar radiation value "DfCounts" of the filter on $t=t_n$;
$X_n$ is the last solar radiation value at $t=t_n$;
$X_{n-1}$ is the previous solar radiation value at $t=t_{n-1}$;
Kd is the fast response filter constant or the acceleration factor.

In view of the above-described implementations of subject matter this application discloses the following list of items, wherein one feature of an example in isolation or more than one feature of said item taken in combination and, optionally, in combination with one or more features of one or more further items are further items also falling within the disclosure of this application:

Item 1. A system for measuring the solar radiation, the system comprising:
- a solar radiation measuring sensor configured to measure a solar radiation at a measuring rate;
- a data logger; and
- a control unit operatively connected to the solar radiation measuring sensor and to the data logger;
- wherein the control unit is configured to determine a recording rate of the data logger, the measuring rate of the solar radiation measuring sensor, and a time constant of the solar radiation measuring sensor,
- wherein, if the time constant of the solar radiation measuring sensor is substantially greater than the measuring rate of the solar radiation measuring sensor and/or if the time constant of the solar radiation measuring sensor is substantially greater than the recording rate of the data logger, the control unit is further configured to modify at least one solar radiation value provided by the solar radiation measuring sensor at the measuring rate, and
- wherein the data logger is configured to at least partly record the at least one solar radiation value modified by the control unit.

Item 2. The system according to item 1, wherein the modified solar radiation value (YN) is calculated as:

$$Y_n = X_n + Kd \cdot (X_{n-1} - X_{n-2})$$

whereas
$Y_n$ is the modified solar radiation value "DfCounts" of the filter at $t=t_n$;
$X_n$ is the last solar radiation value at $t=t_n$;
$X_{n-1}$ is the previous solar radiation value at $t=t_{n-1}$;
Kd is the fast response filter constant or the acceleration factor.

Item 3. A pyranometer comprising:
- a solar radiation measuring sensor configured to measure a solar radiation at a measuring rate; and
- a control unit operatively connectable to the solar radiation measuring sensor and to a data logger, wherein the control unit is configured to determine a recording rate of the data logger, the measuring rate of the solar radiation measuring sensor, and a time constant of the solar radiation measuring sensor,
- wherein, if the time constant of the solar radiation measuring sensor is substantially greater than the measuring rate of the solar radiation measuring sensor and/or if the time constant of the solar radiation measuring sensor is substantially greater than the recording rate of the data logger, the control unit is further configured to modify at least one solar radiation value provided by the solar radiation measuring sensor at the measuring rate, and wherein the data logger is configured to at least partly record the at least one solar radiation value modified by the control unit.

Item 4. The pyranometer according to Item 3, wherein the modified solar radiation value (YN) is calculated as:

$$Y_n = X_n + Kd \cdot (X_{n-1} - X_{n-2})$$

wherein:
$Y_n$ is the modified solar radiation value "DfCounts" of the filter at $t=t_n$;
$X_n$ is the last solar radiation value at $t=t_n$;
$X_{n-1}$ is the previous solar radiation value at $t=t_{n-1}$,
Kd is the fast response filter constant or the acceleration factor.

Item 5. A method of measuring a solar radiation comprising:
- measuring a solar radiation at a measuring rate with a solar radiation measuring sensor, the solar radiation measuring sensor having a solar radiation measuring sensor time constant;
- at least partly recording at least one solar radiation value at a recording rate;
- determining the solar radiation measuring sensor time constant, the recording rate; and the measuring rate;
- wherein, if the time constant of the solar radiation measuring sensor is substantially greater than the measuring rate and/or if the time constant of the solar radiation measuring sensor is substantially greater than the recording rate, further modifying the at least one solar radiation value; and
- at least partly record the modified at least one solar radiation value.

Item 6. The method according to Item 5, wherein modifying the at least one solar radiation value comprises calculating the modified solar radiation value (YN) as:

$$Y_n = X_n + Kd \cdot (X_{n-1} - X_{n-2})$$

wherein
$Y_n$ is the modified solar radiation value "DfCounts" of the filter on $t=t_n$;
$X_n$ is the last solar radiation value at $t=t_n$;
$X_{n-1}$ is the previous solar radiation value at $t=t_{n-1}$;
Kd is the fast response filter constant or the acceleration factor.

REFERENCE NUMBERS

1 . . . system for measuring the solar radiation
2 . . . solar radiation measuring sensor
3 . . . data logger
4 . . . control unit
5 . . . bus or bus system
6 bus or bus system
7 . . . remote control unit
10 . . . network of pyranometers
100 . . . pyranometer(s)
101 . . . dome
102 . . . pyranometer housing
103 . . . supporting foot
104 . . . light diffusor
920 conventional computing environment
922 . . . processing unit 922,
924 . . . system memory
926 . . . system bus.
928 . . . random-access memory (RAM)
930 . . . read only memory (ROM)
932 . . . hard disk drive
934 . . . external disk drive
936 . . . removable disk
938 . . . hard disk drive interface
940 . . . external disk drive interface 944 . . . application program(s)
946 . . . program data
948 . . . keyboard 948 (input device)
950 . . . mouse (input device)
952 . . . serial port interface
954 . . . parallel port interface
956 printer
958 monitor
960 video input/output
962 remote computing device(s)
964 local area network (LAN)
966 wide area network (WAN)
968 network I/O
970 . . . modem
S . . . ground surface

The invention claimed is:

1. A system for measuring the solar radiation, comprising:
a solar radiation measuring sensor configured to measure a solar radiation at a measuring rate;
a data logger; and
a control unit operatively connected to the solar radiation measuring sensor and to the data logger;
wherein the control unit is configured to calculate based on a selectable averaging function at least one average value of the solar radiation measured by the solar radiation measuring sensor over a specified number of solar radiation samples;
wherein the data logger is configured to at least partly record the at least one average value of the solar radiation calculated by the control unit at a recording rate; and
wherein the control unit is configured to determine the recording rate of the data logger and further configured to select the selectable averaging function from a plurality of averaging functions for calculating the average value based on the recording rate of the data logger.

2. The system for measuring the solar radiation according to claim 1, comprising:
wherein the control unit is configured to calculate based on a specified averaging function; and
wherein the control unit is further configured to modify one or more parameters of the specified averaging function.

3. The system for measuring the solar radiation according to claim 1, wherein the recording rate of the data logger is lower than the measuring rate of the solar radiation measuring sensor.

4. The system for measuring the solar radiation according to claim 1, wherein the averaging function is selected from the group consisting of: a true averaging function, a moving averaging function, and an exponential averaging function of the solar radiation measured by the solar radiation measuring sensor over a specified time frame.

5. The system for measuring the solar radiation according to claim 1, wherein when the solar radiation measured by the solar radiation measuring sensor exceeds a specified value, the control unit is configured to calculate a standard deviation value of the solar radiation over a specified number of solar radiation samples.

6. The system for measuring the solar radiation according to claim 5, wherein the control unit is further configured to emit a signal when the solar radiation measured by the solar radiation sensor exceeds the specified value.

7. The system for measuring the solar radiation according to claim 1, wherein when the solar radiation measured by the solar radiation measuring sensor exceed a specified value, the control unit is further configured to determine a number of solar radiation samples exceeding the specified value.

8. The system for measuring the solar radiation according to claim 1, wherein the at least one average value is calculated over a time range, wherein the time range is selected from the group consisting of: a fixed averaging time range and a variable averaging time range.

9. The system for measuring the solar radiation according to claim 1, wherein the solar radiation measuring sensor comprises a thermopile-based sensor, wherein the solar radiation measuring sensor has a measuring rate greater than 2 Hz and the recording rate of the data logger is lower than 1 Hz.

10. The system for measuring the solar radiation according to claim 2, wherein the one or more parameters of the specified averaging function for calculating the average value include an averaging or integration time.

11. A method of measuring a solar radiation comprising:
measuring a solar radiation at a measuring rate; and
calculating based on a selectable averaging function an average value of the solar radiation over a specified number of solar radiation samples, wherein the selectable averaging function is selected based on a recording rate from a plurality of averaging functions for calculating the average value of the solar radiation;
at least partly recording the calculated average value of the solar radiation at the recording rate.

12. The method of measuring the solar radiation according to claim 11, wherein the averaging function is selected from the group consisting of: a true averaging function, a moving averaging function, and an exponential averaging function over a specified time frame.

13. The method of measuring the solar radiation according to claim 11, wherein when the measured solar radiation exceeds a specified value, further comprising:
calculating a standard deviation value of the solar radiation over a specified number of solar radiation samples; and
determining a number of solar radiation samples exceeding the specified value.

* * * * *